(No Model.) 3 Sheets—Sheet 1.

F. KUBEC.
CASH INDICATOR AND RECORDER.

No. 461,386. Patented Oct. 13, 1891.

Witnesses:
Fred Gerlach.
Lute Alter

Inventor:
Fred Kubec
By Prim & Fisher
Attorneys.

(No Model.) 3 Sheets—Sheet 2.
F. KUBEC.
CASH INDICATOR AND RECORDER.
No. 461,386. Patented Oct. 13, 1891.
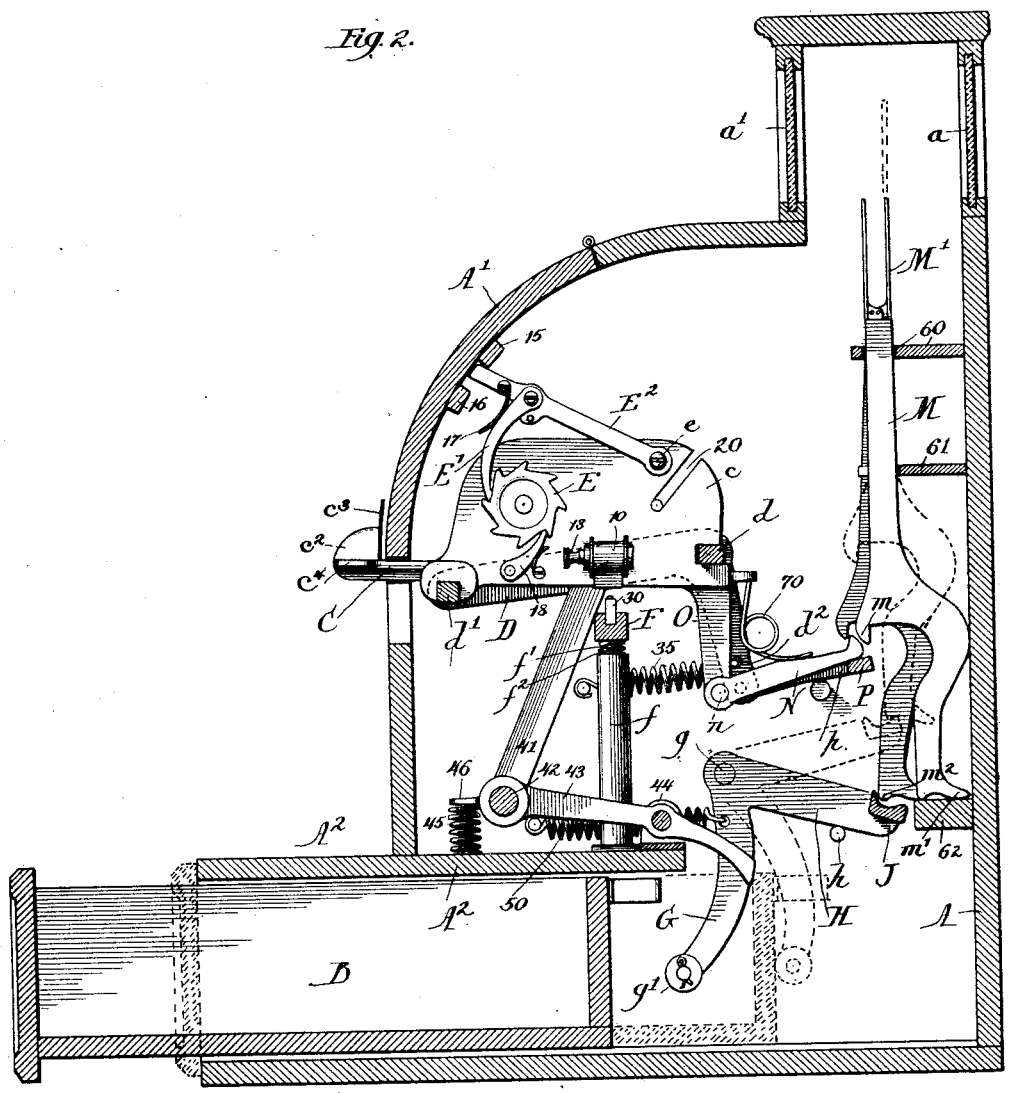
Witnesses:
Fred Gerlach
Luter Alter
Inventor:
Fred Kubec
By Prine & Fisher
Attorneys (No Model.) 3 Sheets—Sheet 3.

F. KUBEC.
CASH INDICATOR AND RECORDER.

No. 461,386. Patented Oct. 13, 1891.

Witnesses:
Fred Gerlach
Lute Alter

Inventor:
Fred Kubec
By Prior & Fisher
Attorneys.

UNITED STATES PATENT OFFICE.

FRED KUBEC, OF CHICAGO, ILLINOIS, ASSIGNOR OF TWO-THIRDS TO MERRICK F. PROUTY AND OSCAR A. MATTHEWS, OF SAME PLACE.

CASH INDICATOR AND RECORDER.

SPECIFICATION forming part of Letters Patent No. 461,386, dated October 13, 1891.

Application filed March 10, 1890. Serial No. 343,255. (No model.)

*To all whom it may concern:*

Be it known that I, FRED KUBEC, residing at Chicago, in the county of Cook and State of Illinois, have invented certain new and useful Improvements in Cash Indicators and Recorders or Registers, of which I do declare the following to be a full, clear, and exact description, reference being had to the accompanying drawings, forming part of this specification.

My present invention has for its object to provide improved mechanism adapted to record the amount of the sales, and mechanism for indicating the individual sales, and improved mechanism for locking and releasing the cash till or drawer.

My invention consists in the various novel features of construction hereinafter described, illustrated in the accompanying drawings, and particularly pointed out in the claims at the end of this specification.

Figure 1:
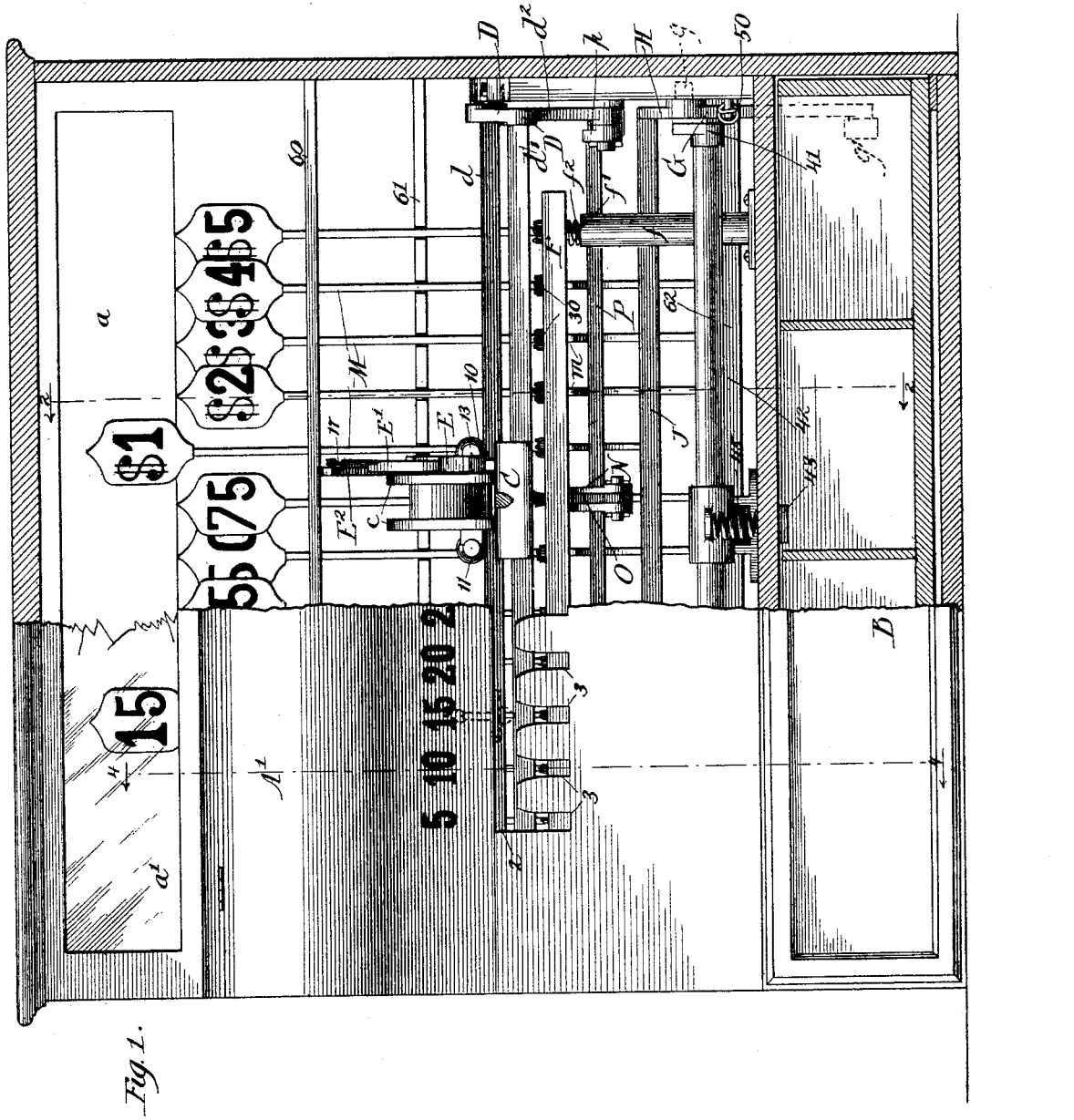
Figure 4:
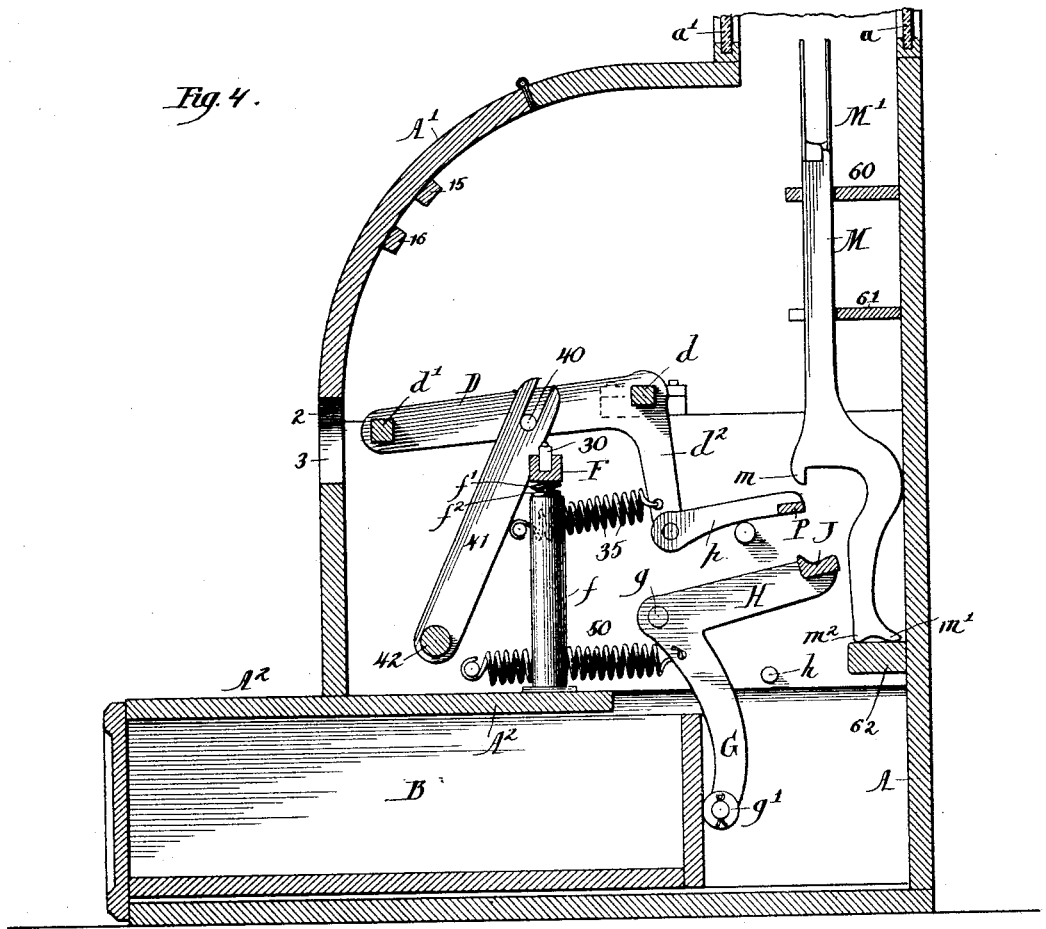
Figure 5:
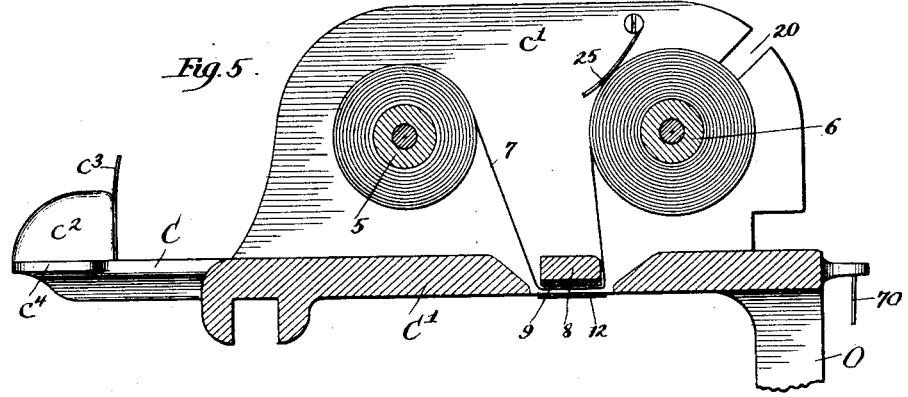

Figure 1 is a view in front elevation, parts being broken away for better illustration. Fig. 2 is a view on line 2 2 of Fig. 1. Fig. 3 is a perspective view showing a portion of the cash drawer or till and the mechanism for locking the same. Fig. 4 is a view in vertical section on line 4 4 of Fig. 1. Fig. 5 is an enlarged detail view, in vertical section, through the paper carrier or frame and its rolls, the operating-lever being shown in side elevation.

A designates the inclosing casing, which may be of any usual or suitable construction, the upper portion of this casing being provided with suitable sight-openings $a$ and $a'$, (one or both,) through which the tablets of the indicator-rods may be seen. The upper front portion of the inclosing casing is provided in well-known manner with a hinged front A', by which access can be had to the interior mechanism, and the lower portion of the casing is of suitable size and shape to receive a suitable cash till or drawer B. Across the front of the inclosing casing A is formed a long slot 2, from which extend transverse slots 3 in suitable number corresponding with the number of the individual amounts which the mechanism may be adapted to record and indicate, and above each of these transverse slots 3 is placed a number, (as more particularly seen in Fig. 1,) corresponding to the number which will be indicated and recorded when the operating-bar C is caused to pass from the main slot 2 into such transverse slot 3. This operating-bar C projects from the frame C' that is suitably mounted in a manner free to slide upon the pivot-bar $d$ and the swinging bar $d'$ of the vibrating frame D.

Within the side plates $c$ and $c'$ of the frame C' are journaled the paper-carrying rolls 5 and 6, upon which will wind the paper strip 7, whereon the recording or registration of the amount of the sales will be effected. The roll 6 when first placed into the machine will carry the entire mass of the paper strip, which will be passed down beneath the plate-bar 8, the under side of which will be faced by a suitable cushion 9, and will be attached to the roll 5, whereon it will be wound by the operation of the machine, as will presently appear herein.

On each side of the frame C' is suitably sustained the ink-ribbon rolls 10 and 11, the ribbon 12 passing from these rolls beneath the platen-bar 8, as more particularly seen in Fig. 5. One of these ink-ribbon rolls 10 is provided with a thumb-wheel 13, by which the ribbon may be advanced from time to time to expose a sufficient surface, although, if desired, any of the well-known ink-ribbon automatic feeding devices may be employed in connection with these ribbon-rolls.

Upon one end of the paper-winding roll 5 is fastened a ratchet-wheel E, with which will engage a feed-pawl E', carried by the feed-bar $E^2$, that is pivoted, as at $e$, to one of the side plates of the frame C', and has its opposite end extending between the bars 15 and 16 upon the under side of the hinged cover A' of the casing in such manner that the bar $E^2$ can freely move from side to side of the machine. The pawl E' is forced into normal engagement with the ratchet-wheel E by means of a suitable spring 17, and the ratchet-wheel E is guarded against backward rotation by a suitable check-pawl 18. The side plates $c$ and $c'$ of the frame C' are by preference provided with the slots 20, in which is journaled the paper-carrying roll 6, so that a fresh roll can be readily inserted in position from time to time, as required, and in like manner also open bearings may be provided for the paper-winding roll 5, if desired, and by preference a spring 25, attached to one of the side plates $c'$ of the frame C′, will bear against the paper wound upon the roll 6, in order to insure the even unwinding of the paper from the roll.

Beneath the platen-bar 8, from side to side of the machine, extends a type-carrier F, that is conveniently sustained, as by posts $f$, at the sides of the machine, suitable rods $f'$, extending from the type-carrier F into the posts $f$, these rods being encircled by springs $f^2$ to cushion the type-carrier and insure a more perfect impression from the type.

Along the type-carrier and opposite the transverse slots 3 in the front of the main casing will be fastened the type 30, the number, character, and location of these types corresponding with the amounts represented by the figures above the transverse slots.

The outer end of the operating-bar C is preferably provided with a vertical rib $c^2$, terminating in a pointer $c^3$, the rib permitting the ready movement of the operating-bar from side to side of the machine, and the bar is also by preference furnished with extensions $c^4$ on each side of the rib $c^2$, which permit the easy depression of the bar.

From the construction of parts, as thus far defined, it will be seen that when a sale has been made and it is desired to register or record the amount thereof the operator will grasp the outer end of the operating-bar C and move this bar laterally until its pointer is brought coincident with the amount corresponding to the amount of the sale. This lateral movement of the operating-bar C will carry with it the frame or paper-carrier C′, this frame sliding freely upon the bars $d$ and $d'$ of the vibrating frame D and bringing the platen-bar 8 above the type 30, adapted to print the amount corresponding with that indicated above the transverse slot at which the operating-bar C has been arrested. If, now, the outer end of the operating-bar C be depressed, it will cause the vibrating frame D to swing downward and carry with it the frame C′ until the platen-bar 8 forces the ink-ribbon 12 against the type 30 and causes the impression of such type upon the paper strip 7. It will be observed that during this downward movement of the frame C′ the outer end of the feed-bar E², being held by the guard-strips 15 and 16, will be prevented from moving downward to any considerable extent, so that by the movement of the frame C′ the ratchet-wheel E will be moved to such extent that the feed-pawl E′ will be caused to engage with the next succeeding notch. Hence when the operating-bar is caused to swing upward to its normal position the feed-pawl E′, remaining stationary at such time, will cause a partial rotation of the ratchet-wheel E sufficient to bring a fresh portion of the paper strip beneath the platen-bar 8. The frame C′ is swung upward into its normal position by means of suitable springs 35, suitably attached to the ends of the main casing and to the dependent arms $d^2$ of the vibrating frame D. Hence it will be seen that after each impression made by the type 30 upon the paper strip 7 this strip will be suitably advanced to receive the next impression, so that when it is desired to determine the amount of the sales it is only necessary to add up the individual sums printed upon that portion of the paper strip 7 wound upon the paper-roll 5 and between such roll and the platen-bar 8.

In order to release the cash drawer or till when a sale has been made, I have provided the side bars of the vibrating frame D with inwardly-projecting studs or pins 40, that engage with suitable seats in the upper ends of the arms 41, attached to the releasing-bar 42. This releasing-bar 42 is suitably attached to the rear end of a locking-bar 43, that is suitably pivoted to a plate 44 upon the false bottom A² of the machine. The rear end of this locking-bar 43 is held normally depressed by means of a spring 45, located between the false bottom A² and a lug 46, projecting from the rear end of the locking-bar 43. Hence it will be seen that when the operating-lever C has been forced downwardly into one of the transverse slots 3 in order to record the amount of a sale the consequent downward movement of the side bars of the vibrating frame D will cause the arms 41 of the releasing-bar 42 to be depressed, and will rock the locking-bar about its pivot-point to such extent as to free its rear end from engagement with the back plate of the cash drawer or till B.

In order to insure the opening of the till or drawer when it has been thus released, I prefer to employ suitable vibrating arms G, that are pivotally sustained, as at $g$, to the end plates of the main casing, the lower ends of these arms G being furnished by preference with rollers $g'$, that bear against the back plate of the cash drawer or till, and to the arms G are attached suitable springs 50, fastened to the arms G and to the end plates of the casing, and serving to draw the depending arms G normally in forward direction. The arms G are shown as formed in piece with the rearwardly-extending arms H of the lifting-bar J, that is restricted as to its downward movement by a suitable stop or stops $h$, projecting inwardly from the end plates of the casing. From this construction it will be seen that when the till or drawer B has been released in manner before defined the pressure of the rollers $g'$, incident to the traction of the springs 50 upon the arms G, will cause the till B to be given an initial outward movement, so that the cash within the drawer or till will be accessible to the salesman, in order to enable him to make the proper change and deposit the amount received.

In order to indicate to the purchaser the amount that he is to pay the cashier or salesman, I provide the improved mechanism next to be described.

At the back of the inclosing casing are held a series of tablet-rods M, carrying at their upper ends indicating-tablets M', adapted to be exhibited through the sight-openings $a$ and $a'$ of the inclosing casing when the tablet-rods have been lifted, as will presently appear. These tablet-rods M are conveniently held in position by means of a plate 60, having perforations therein to permit the tablet-rods to move in vertical direction, and by a plate 61, having corresponding perforations, preferably formed as open slots, in order to allow for a slight forward-and-backward movement of the tablet-rods, as will presently appear. The tablet-rods M will correspond in number and location with the amounts which the machine is adapted to record or register, and these rods have their lower ends resting normally upon the bar 62 at the back of the main casing. Each of the rods M is provided with a lug or shoulder $m$, adapted to be engaged by the hooked end of a shifting-pawl N, the opposite end of which is pivotally connected, as at $n$, to the lower end of a bar O that depends from the rear of the sliding frame C'. The rear end of the shifting-pawl N is held normally against a throw-off bar P, that is pivotally connected by means of the end bars $p$ to the dependent arm $d^2$ of the vibrating frame D. The tablet-rods M have their lower portions curved backwardly a sufficient distance to permit the hooked end of the releasing-pawl N to freely engage with the lugs or shoulders $m$ of the rods and to permit the lifting of the rods without contact of the releasing-bar P, the shifting-pawl N, as held normally against the releasing-bar P by means of a spring 70, having one end bearing against this pawl and its opposite end attached to a projecting portion of the sliding frame C'.

From the construction as above defined it will be seen that when the salesman has moved the operating-bar C to a position above the transverse slot 3, corresponding to the amount of the sale, and has depressed the operating-lever, so as to cause a record of the sale to be made upon the paper strip in manner before defined, the movements of the parts, as above stated, will cause the release and outward movement of the cash drawer or till; but the indicating-tablets corresponding to the amount of the sale will not be exposed to view through the side-openings $a$ and $a'$ of the inclosing casing until the salesman has closed the drawer or till. The downward movement of the operating-bar C, necessary to effect the recording of the sale upon the paper strip and to effect the release of the drawer or till, will, however, cause the shifting-bar N to be forced backward until its rear hooked end engages with the lug or shoulder $m$ upon the corresponding tablet-rod, and when the operating-lever is released and is caused to swing upward by the traction of the springs 35 the backward movement of the shifting-pawl N will draw with it the lower portion of the tablet-rod M until the toe $m'$ of the tablet-rod rests upon the transverse bar 62, while the heel $m^2$ of the tablet-rod is in position to be struck by the lifting-bar J. If now the till or drawer be forced inward, its back plate will cause the arms G and H to rock about their pivot-points $g$, and will consequently cause the lifting-bar J to move upward until this bar contacts with the heel or lower end of the tablet-rod M, that has been thus shifted, and lifts this tablet-rod to such extent that its tablet M' will come coincident with the sight-openings $a$ and $a'$ of the inclosing casing. The tablet-rod M will thus remain in elevated position so long as the drawer or till B is closed; but as soon, however, as the operating-lever is again depressed to record or register a new sale, the backward movement of the arm $d^2$ of the vibrating frame, incident to the depression of the operating-lever, will cause a corresponding backward movement of the releasing-bar P, which will strike against the lower portion of the elevated tablet-rod M, thereby forcing this rod from off the lifting-bar J and causing it to drop upon the transverse bar 62. It is obvious that as the tablet rods M are cut away or bent backwardly at the rear of the lugs or shoulders $m$ this backward movement of the releasing-bar P will effect only such tablet-rod or rods as may be in elevated position. It is obvious that if the salesman desires to expose several tablets at the same time through the sight-openings it will only be necessary for him to allow the drawer or till B to remain open after each depression of the operating-lever, so as to cause the desired number of tablet-rods to be moved successively by the shifting-pawl N into position to be lifted by the lifting-bar J when the till or drawer is closed.

In order to insure the locking of the till or drawer when a tablet-rod is lifted to expose its tablet through the sight-openings of the inclosing casing, I prefer to provide the back plate of the drawer or till with a supplemental latch-bar R, suitably affixed thereto, so that when the drawer or till has been moved inward, even to a less extent than is necessary to effect the complete lifting of the tablet-rods, the supplemental latch-bar R will pass behind the end of the locking-bar 43 and will prevent the opening of the till until the operating-lever C has been again moved to record a further sale.

While I have described one embodiment of my invention it will be plain to the skilled mechanic that the details of construction above set out may be varied within wide limits without departing from the spirit of my invention. So, also, various features of the invention hereinafter defined in the claims may be used without the adoption of the invention as an entirety, or in connection with other forms of devices than the specific devices in conjunction with which such features are shown. Thus, for example, instead of the employment of printing-type other devices adapted to print upon, mark, or perforate the paper might be employed, and I do not wish, therefore, that the term "type," as used in the claims, shall be regarded as a term of restriction. So, also, I regard it as within the scope of my broad invention to operate the tablet-rods by the movement of the drawer, whether the drawer be released by a single lever or otherwise and whether the lifting of the tablet-rods is effected by the inward or outward movement of the drawer.

Having thus described my invention, what I claim as new, and desire to secure by Letters Patent, is—

1. In a cash register or recorder, the combination, with a series of type arranged across the machine, of a movable paper-carrier sustained in a manner permitting it to be freely moved back and forth across the type, and means for moving said paper-carrier across the type and for forcing it toward the type to effect the recording of the amounts represented by the type, substantially as described.

2. In a cash register or recorder, the combination, with a series of type, of a movable paper-carrier provided with rolls for carrying a paper strip, and means for automatically turning said roll after each impression for the purpose of advancing the paper strip, substantially as described.

3. In a cash register or recorder, the combination, with a series of type, of a movable paper-carrier provided with a bar for freely moving the carrier back and forth and provided with rolls for carrying a paper strip, and a pawl-and-ratchet mechanism for advancing said paper strip, substantially as described.

4. In a cash register or recorder, the combination, with a series of type, of a movable paper-carrier adapted to be brought above said type, and an operating-bar extending outside the main casing of the machine and connected with said paper-carrier in order to move the same back and forth, substantially as described.

5. In a cash register or recorder, the combination of a main casing provided with a long slot extending across the face thereof and transverse slots extending from said long slot, a series of type, a movable paper-carrier adapted to be brought above said type, and an operating-bar extending through the long slot of the main casing, whereby said carrier can be moved back and forth by said bar, substantially as described.

6. In a cash register or recorder, the combination, with a series of type arranged across the machine, of a main casing provided with a long slot extending across the front thereof and with transverse slots extending from said long slot, a movable paper-carrier provided with winding rolls, and feed mechanism and an operating-bar for moving said paper-carrier back and forth across the type and for forcing it toward the type, substantially as described.

7. In a cash register or recorder, the combination, with a series of type arranged across the machine, of a movable paper-carrier provided with rolls for advancing a paper strip, a pawl and a ratchet for automatically advancing said strip in the direction of its length at each impression, and suitable means for holding said pawl during the movement of the paper-carrier toward the type, substantially as described.

8. In a cash register or recorder, the combination, with a series of type arranged across the machine, of a movable paper-carrier provided with rolls for carrying a paper strip, a ratchet-wheel affixed to one of said rolls, a pawl for advancing said ratchet-wheel, a pawl-bar sustained by said paper-carrier and serving to move said pawl, and a suitable stop for engaging the free end of said pawl-bar to hold the pawl during the movement of the paper-carrier toward the type, substantially as described.

9. In a cash register or recorder, the combination, with a series of type, of a movable paper-carrier adapted to be brought above said type, and an operating-lever for forcing said paper-carrier toward the type and connected to the paper-carrier to move said carrier back and forth, and an inking-ribbon located intermediate the type and the paper-carrier, substantially as described.

10. In a cash-register, the combination, with a series of type, of a movable paper-carrier adapted to be brought above said type, a vibrating frame or bar whereon said paper-carrier is mounted and whereby the paper-carrier is moved toward and from the type, and an operating-lever extending outside the casing of the machine and connected to the paper-carrier to move it back and forth and to vibrate said frame, substantially as described.

11. In a cash register or recorder, the combination, with the main casing provided with a till or cash-drawer, of an operating-bar laterally movable across the machine, lock mechanism for said till or drawer, and suitable connecting mechanism whereby said lock mechanism can be controlled by said operating-bar, substantially as described.

12. In a cash register or recorder, the combination, with a main casing provided with a till or cash-drawer, of an operating-bar movable in vertical direction and also laterally movable from side to side of the machine, lock mechanism for said till or drawer, and suitable connecting mechanism whereby said lock mechanism can be controlled by said operating-bar, substantially as described.

13. In a cash register or recorder, the combination, with a main casing provided with a till or cash-drawer, of an operating-bar laterally movable across the machine, a vibrating frame for sustaining said operating-bar, a lock mechanism for the till or drawer, and suitable connections between said vibrating frame and said lock mechanism, substantially as described.

14. In a cash register or recorder, the combination, with a main casing provided with a till or cash-drawer and provided also with a longitudinal slot and with transverse slots extending therefrom, of a vertically and laterally movable operating-bar projecting through said longitudinal slot, lock mechanism for said till or drawer, a vibrating frame for sustaining said operating-bar, and suitable connections between said vibrating frame and said lock mechanism, substantially as described.

15. In a cash register or recorder, the combination, with a main casing having a cash drawer or till, of a laterally-movable operating-bar, a vibrating frame for sustaining said operating-bar, a locking-bar for engagement with the cash drawer or till, and suitable bars connecting said vibrating frame with said locking-bar, substantially as described.

16. In a cash register or recorder, the combination of a laterally-movable paper-carrier, an operating-bar whereby said paper-carrier is moved from side to side of the machine, a cash drawer or till, lock mechanism for said drawer or till, a vibrating frame for sustaining said paper-carrier, and suitable connections between said vibrating frame and said lock mechanism, substantially as described.

17. In a cash register or recorder, the combination, with a main casing having a cash drawer or till, of a laterally-movable operating-bar, lock mechanism for said drawer or till, suitable connections between said lock mechanism and said operating-bar, whereby said drawer or till can be released by the movement of said operating-bar, and a spring-actuated arm for forcing said drawer or till outward when the lock mechanism is released, substantially as described.

18. In a cash-indicator, the combination, with a series of tablet-rods and with a drawer or till, of a suitable lifting-bar operated by the movement of said drawer and serving to raise the tablet-rods, substantially as described.

19. In a cash-indicator, the combination, with a casing having a sight-opening through which the tablets may be exposed to view, and with a series of tablet-rods and tablets and a cash drawer or till, of a shifter operated by said drawer or till to move any one of said tablet-rods into position to expose the tablets through the sight-opening, substantially as described.

20. In a cash-indicator, the combination, with an inclosing casing having a sight-opening through which the tablets may be exposed to view, and with a series of tablet-rods and tablets and a cash drawer or till, of a shifter common to a number of said tablet-rods and operated by said drawer or till to move any one of said tablet-rods into position to expose the tablets through the sight-opening, substantially as described.

21. In a cash-indicator, the combination, with a series of tablet-rods and a drawer or till, of a vibrating bar common to a number of said tablet-rods and arranged to move said tablet-rods in order to expose their tablets, and a suitable arm connected with said shifting-bar and projecting into the path of travel of the drawer or till, substantially as described.

22. In a cash-indicator, the combination, with a series of tablet-rods and a drawer or till, of a lifting-bar adapted to raise said tablet-rods, a vibrating frame for said lifting-bar having a part projecting into the path of the drawer or till, and a spring for retracting said lifting-bar, substantially as described.

23. In a cash-indicator, the combination, with a series of tablet-rods movable freely both in horizontal and vertical direction, of a shifting device controlled by the hand of the operator and arranged to move one or more of said tablet-rods out of vertical alignment, and a lifting device adapted to operate after the tablet-rods have been so moved out of alignment to raise said rods so moved out of alignment without disturbing the other rods, substantially as described.

24. In a cash-indicator, the combination, with a series of tablet-rods having suitable lugs or shoulders, of a shifting-bar for moving said tablet-rods from their normal position and a lifting-bar common to a number of tablet-rods for raising the tablet-rods when so shifted, substantially as described.

25. In a cash-register, the combination, with a series of tablet-rods, of a shifting-bar common to said tablet-rods and movable back and forth from side to side of the machine and adapted to move said tablet-rods out of their normal position, and a suitable lifting-bar for raising any tablet-rod so shifted, substantially as described.

26. In a cash-indicator, the combination, with a series of tablet-rods, of suitable means for moving one or more of said tablet-rods out of vertical alignment with the others of said rods, and a vibrating lifting-bar adapted to raise said tablet rod or rods so shifted, and suitable means for operating said lifting-bar, substantially as described.

27. In a cash-indicator, the combination, with a series of tablet-rods, of a laterally-movable shifting-bar adapted to engage with said tablet-rods to shift the same out of normal position, suitable lifting mechanism for raising said tablet-rods when so shifted, and a laterally-movable operating-bar connected with said shifting-bar and extending through the casing of the machine, substantially as described.

28. In a cash-indicator, the combination, with a series of tablet-rods, of a laterally-movable shifting-bar, a suitable frame or carrier whereby said shifting-bar is carried, a laterally-movable operating-bar, said operating-bar and the carrier whereby the shifting-bar is carried being mounted in a manner permitting the same to be moved back and forth from side to side of the machine and to vibrate in order to cause the shifting-bar to move the tablet-rods, and suitable means for lifting the tablet-rod when shifted, substantially as described.

29. In a cash-indicator, the combination of a series of tablet-rods provided with lugs or shoulders, a laterally-movable shifting-bar having one end adapted to engage with the lugs or shoulders of the tablet-rods in order to move said rods from their normal position, a suitable frame or carrier for sustaining said shifting-bar, and a laterally-movable operating-bar extending outside the inclosing casing and connected with said frame or carrier, substantially as described.

30. In a cash-indicator, the combination of a series of tablet-rods having lugs or shoulders, a laterally-movable shifting-bar adapted to engage with the lugs or shoulders of said tablet-rods to move them from their normal position, a laterally-movable frame or carrier, to which said shifting-bar is pivotally connected, and an operating-lever also connected to said frame or carrier, said operating-lever being sustained in a manner free to move in horizontal and vertical direction, substantially as described.

31. In a cash-indicator, the combination, with a series of tablet-rods, of a transverse bar whereby said tablet-rods are normally sustained, a lifting-bar movable in proximity to said transverse bar, and suitable means for shifting said tablet-rods, so as to cause a portion of said rods to project into the path of travel of said lifting-bar, substantially as described.

32. In a cash-indicator, the combination of a series of tablet-rods, a shifting-bar for moving said tablet-rods from their normal position, a lifting-bar for raising and holding the tablet-rods so shifted, and a push-off bar for moving said tablet-rods when lifted from off said lifting-bar, substantially as described.

33. In a cash-indicator, the combination, with a series of tablet-rods, of a shifting-bar for moving said tablet-rods from their normal position, a lifting-bar for raising said tablet-rods when so shifted, a push-off bar for moving said tablet-rods from off the lifting-bar, a vibrating frame whereby said push-off bar is sustained, and an operating-bar extending outside the inclosing casing and serving to vibrate said frame, substantially as described.

34. In a cash-indicator, the combination of a series of tablet-rods provided with lugs or shoulders $m$ and having bent or cut-away portions behind said lugs or shoulders, a suitable shifting-bar N to engage with said lugs or shoulders in order to move the tablet-rods from their normal position, a suitable lifting-bar J, adapted to raise the tablet-rods so shifted, a push-off bar P for restoring the tablet-rods to their normal position, and suitable means whereby said shifting push-bar and said lifting-bar are operated, substantially as described.

35. In a cash register or recorder, the combination, with the inclosing casing and a drawer or till, of a supplemental latch-bar attached to said drawer or till and a locking-bar adapted to engage with said drawer or till and with the supplemental latch-bar, substantially as described.

FRED KUBEC.

Witnesses:
GEO. P. FISHER, Jr.,
I. B. CARPENTER.